Oct. 27, 1953

A. C. GANNON ET AL 2,656,785

MEAT CURING DEVICE

Filed Oct. 7, 1949

INVENTORS.
ALFRED C. GANNON,
CORNELIUS E. KILBY,
BY VIRGIL R. RUPP,

Lockwood, Goldsmith & Galt.
ATTORNEYS.

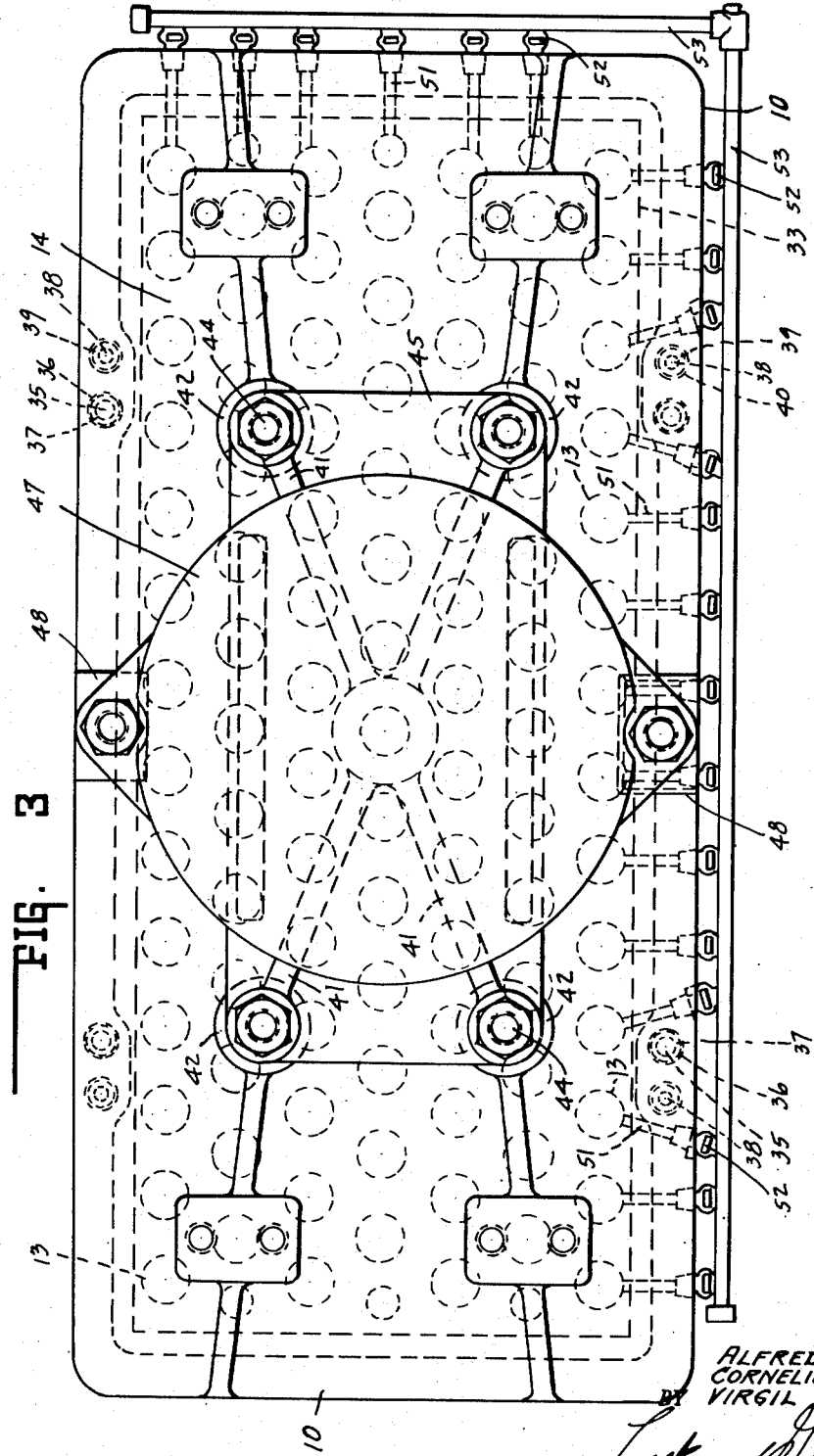

Patented Oct. 27, 1953

2,656,785

UNITED STATES PATENT OFFICE 2,656,785

MEAT CURING DEVICE

Alfred C. Gannon, Indianapolis, Cornelius E. Kilby, Knightstown, and Virgil R. Rupp, Indianapolis, Ind., assignors to Kingan & Co., Incorporated, Indianapolis, Ind.

Application October 7, 1949, Serial No. 120,178

2 Claims. (Cl. 99—257)

1

This invention relates to a meat curing device of the character for injecting a curing pickle brine into a slab of meat to be cured, such as a side of bacon.

It is the purpose of the invention to reduce the time required for the curing process of meats, and particularly bacon, by forcing a series of needles into the bacon bellies at numerous points forming a selected pattern throughout the belly so that the intervening area between the respective needles may receive the benefit of the pickling treatment. The amount of the pickle injected is determined by the weight of the meat to be cured.

The feature of the invention therefore resides in such a device for accomplishing the above objective having a series of cylinders in communication with a pickle brine containing reservoir, each cylinder being provided with a suitable hollow injecting needle having spaced apertures therein, and plungers simultaneously movable in said cylinders to draw a predetermined quantity of pickle from the reservoir into each cylinder on the suction stroke and force the pickle through the ports in the needle on the pressure stroke.

Another feature of the invention resides in the mounting of the plungers and the ported structure thereof for simultaneous movement on the suction stroke and pressure stroke, the ported structure being such as to develop a vacuum in the respective cylinders on the suction stroke, at the end of which the pickle will be drawn into said cylinders. At the beginning of the pressure stroke the ports in said pistons will be self sealing within the cylinders causing the applied pressure to eject the pickle through the needles.

Another feature of the invention resides in the provision of a check valve between the discharge end of each cylinder and its needle to prevent suction through the needle into the cylinder during the suction stroke of the piston to thereby provide a vacuum seal.

Another feature of the invention resides in the spring pressed stripper plate surrounding the needles such as to limit the entry thereof into the meat to the prescribed depth, while stripping the meat from the needles under spring pressure when relieved.

Another feature of the invention resides in the adjustment for limiting the pressure stroke of the plungers within the cylinders to thereby control the charge of pickle according to the weight of the meat being cured.

Still a further feature of the invention resides in the bleeding ports communicating with certain of the outer cylinders to render them ineffective and thereby reduce the number of effective cylinders according to the area of the meat to be treated.

The full nature of the invention will be understood from the accompanying drawings and the following description and claims.

2

Fig. 3 is a top plan view of the device.

Figure 1:
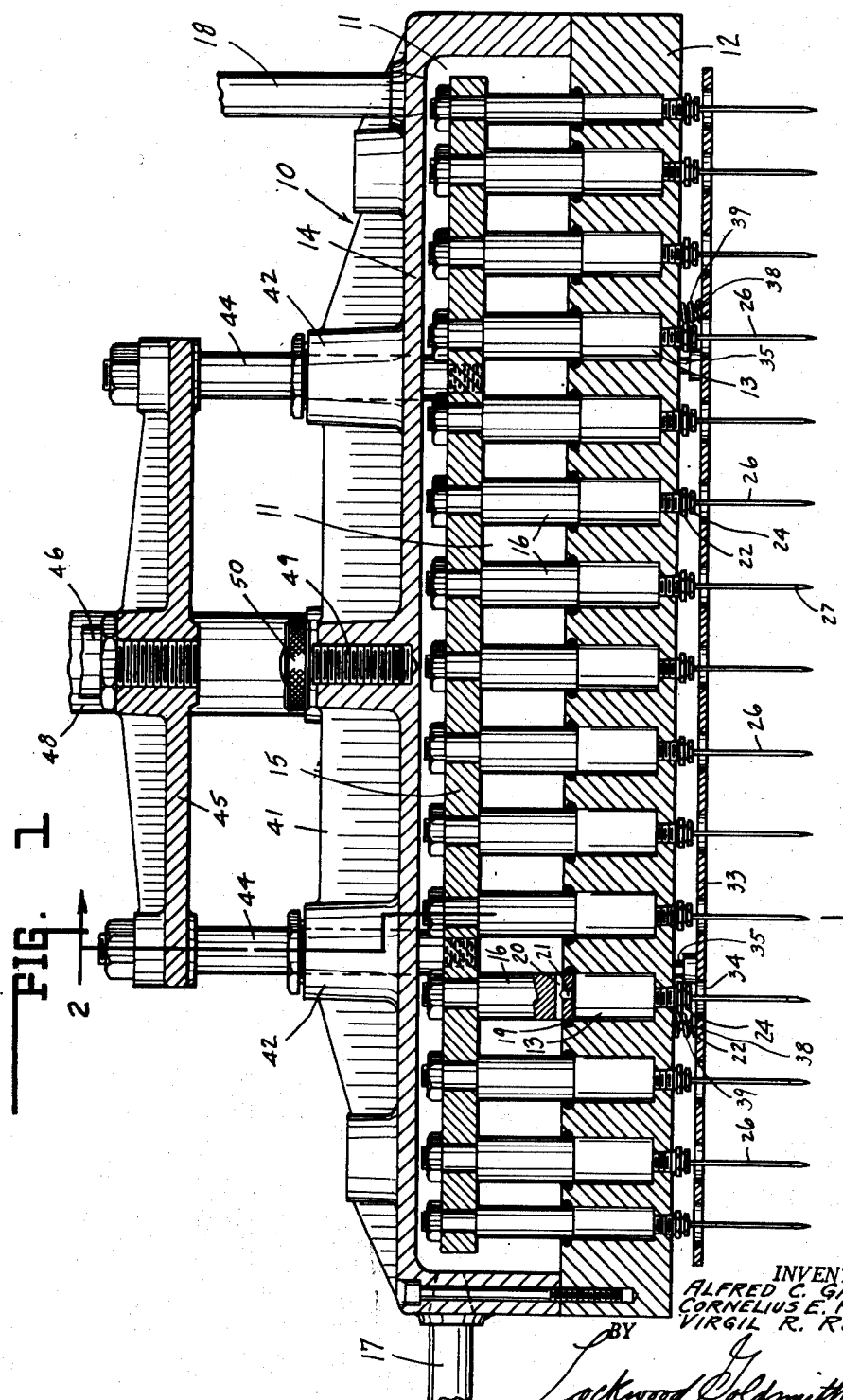
Fig. 1 is a central vertical section through the device with the upper portion thereof broken away and parts shown in elevation.
Figure 2:
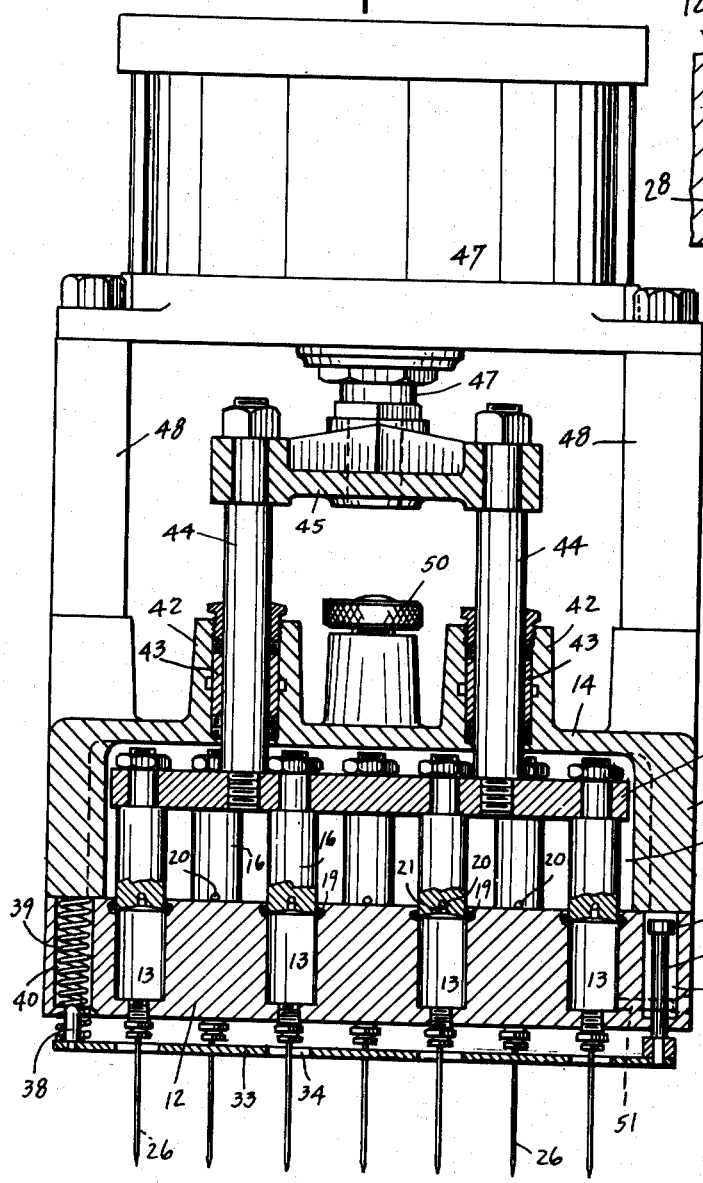
Fig. 2 is a section taken on the line 2—2 of Fig. 1 with parts shown in elevation.
Figure 4:
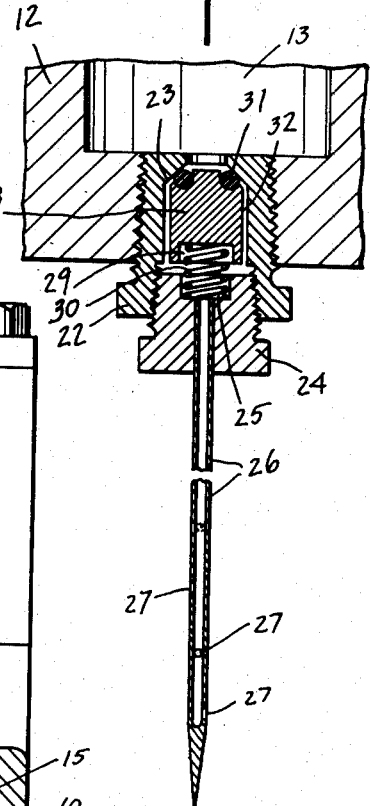
Fig. 4 is an enlarged sectional view through one of the needles and the vacuum check valve in the lower portion of one of the cylinders.
Figure 5:
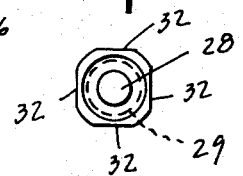
Fig. 5 is a plan view of the vacuum check valve.

In the drawings there is shown a header 10 having a pickle brine containing reservoir 11. Said header includes a bottom casting 12 formed with a series of cylinders 13. Secured over the bottom casting and sealed thereon there is a cover casting 14 enclosing the reservoir. Movable within the reservoir there is a plunger plate 15 to which are secured a series of plungers 16. Each plunger is aligned with and extends into one of the cylinders 13 for reciprocal movement therein.

Brine is introduced into the reservoir 11 through the inlet connection 17, flowing through the reservoir and from the outlet connection 18. The flow of brine is preferably from a pump or suitable overhead container remaining open to the reservoir 11 so that it is continuously filled and no air is permitted to enter.

Each of the pistons 16 is so arranged that its lower tip end extends into the cylinder 13 at all times, being surrounded by a packing ring 19 carried by an annular groove in the cylinder wall. Each piston has a transverse bore 20 communicating with a centrally disposed port 21. Said bore is located in the extreme end portion of the piston for communication with the reservoir 11 when the piston reaches the end of its suction stroke, but at the beginning of the pressure stroke it will be self-sealed by the cylinder wall and packing ring 19.

At the lower end of each cylinder and carried by the bottom casting 12 there is a nipple 22 internally beveled at its upper end 23. Threaded into the lower end of the nipple there is a needle head 24 having a pocket 25 in the upper end thereof. The needle 26 is secured to the head 24 to extend downwardly therefrom, being hollow but closed and pointed at its lower end, and provided with a series of discharge apertures 27. Slidably mounted within the nipple 22 between the needle head 24 and the beveled end 23 of the nipple there is a vacuum check valve 28 having a pocket 29 opposed to and in alignment with the pocket 25. Seated in said pockets 25 and 29 there is a compression spring 30 urging said valve upwardly into sealing engagement with the beveled end 23 of the nipple. Said valve is formed with a conical head portion conforming to the end portion 23 and surrounded by a sealing ring 31. The body of the valve is out of round being formed with a series of flats 32. Thus fluid may flow past the valve 28 when its sealing ring is unseated from the conical end 23 of the nipple.

Below the body casting 12 of the header there is a stripper plate 33 having a series of openings 34 through which the needles extend. Said plate is supported by mounting rods 35 slidable upwardly within the recesses 36 provided in the bottom casting, each rod has an enlarged head 37 for limiting the downward movement of the stripper plate and preventing its dropping from the header. At intervals said stripper plate is provided with studs 38 each seating a compression spring 39 mounted in the recess 40 of the bottom casting. Thus the stripper plate is urged downwardly under spring tension to separate or strip the meat from the needles when the support for the meat is withdrawn, or the header raised therefrom.

The cover casting 14 is provided with criss cross reinforcing struts 41 each having a boss 42. Slidable within the bearings 43 provided in said bosses there are connecting rods 44. The lower end of each connecting rod is secured to the plunger plate 15 and the upper end thereof to the pressure head 45. The pressure head is actuated by a piston rod 46 extending into an air or hydraulic cylinder 47 carried by the uprights 48 mounted on the header 10. Through the usual hydraulic action which may be exerted on the header 45, the plunger plate with its battery of plungers is moved up and down within the header 10. To adjustably limit the extent of the stroke, and thereby control the quantity of pickling brine discharged into the meat, there is provided a stop screw 49 having a head 50 with which the pressure head 45 may engage to limit its downward pickle ejecting stroke.

In operation, the side of bacon or other meat to be cured, may be placed upon a suitable table or platform adapted to be raised relative to the header and its needles until the needles extend therein to within a short distance of the far side. On the other hand, the meat may be supported by a stationary table or platform and the header brought down into needle penetrating position relative thereto.

At the beginning of the injecting cycle the plungers are at their lowermost positions. Upon the meat being penetrated by the needles, the plungers are elevated by air or hydraulic pressure, springs 30 sealing the vacuum check valves 28. The suction stroke of the plungers thereby creates a vacuum due to the sealing action of the rings 19. Upon the bores 20 of the plungers passing above the cylinders the vacuum is thereby broken and the pickling brine within the reservoir rushes through the ports 21 filling the cylinders. Thereupon the air or hydraulic pressure is reversed to force the plungers on their pressure stroke downwardly in the cylinders. As the bores 20 pass the sealing rings 19 the brine is thereby sealed in the cylinders and forced downwardly opening the valves 28 against their springs 30 forcing the brine through the discharge apertures 27 of the needles. This completes the cycle, the plungers remaining in their lowered positions until the beginning of the next injecting operation. The supporting table or platform for the meat is then lowered whereupon the stripper plate 33, under pressure of its springs 39 strips the meat from the needles. This same action would occur wherein the meat may rest on a stationary support and the header raised therefrom.

By arranging a series of bleeder ports 51 to extend through the side walls of the bottom casting 12 the cylinders to which they are connected may be bled off through valves 52 into a manifold 53 through which the brine forced out of said cylinders will be by-passed back to the supply container instead of being discharged through the needles. By means of this arrangement the outer series of cylinders may be rendered ineffective wherein the meat to be cured is not of sufficient area to receive the needles extending therefrom. Thus, differently sized operations may be performed by the same pickling device.

The invention claimed is:

1. A fluid control device including a housing enclosing a fluid reservoir, a cylinder having a fluid receiving end and a discharge at the opposite end, a normally closed vacuum check valve in said discharge end, a plunger extending into said cylinder through said receiving end, said plunger having a bore between its entering end and the adjacent wall thereof, a sealing ring in said cylinder adjacent its fluid receiving end in sealing contact with said plunger, power means connected with said plunger for moving it through a suction stroke to draw a vacuum in said cylinder and admit fluid thereto upon said bore being freed from said sealing ring, and moving it through a pressure stroke to force the fluid from said cylinder through said check valve when sealed by said ring, and means for adjusting the pressure stroke of said plunger.

2. A meat curing device comprising a header having a reservoir for containing a pickling brine, a series of injecting needles extending from said header adapted to be forced into the meat to be cured, said series of needles being substantially co-extensive therewith, a series of cylinders in said header each connected with one of said needles, a plunger operative in each cylinder and having a port therein, power means for reciprocating said plungers in unison to expose said ports and permit the brine to enter said cylinders from said reservoir and be forced therefrom through said needles, a series of outer cylinders, and a series of by-pass channels communicating with said header cylinders and said outer cylinders for relieving said header cylinders from brine to reduce the area of effective cylinders and needles.

ALFRED C. GANNON.
CORNELIUS E. KILBY.
VIRGIL R. RUPP.

References Cited in the file of this patent

UNITED STATES PATENTS

| Number | Name | Date |
|---|---|---|
| 312,648 | Merrell | Feb. 24, 1885 |
| 751,555 | Prescott | Feb. 9, 1904 |
| 982,601 | Hardy | Jan. 24, 1911 |
| 1,126,579 | Servatius | Jan. 26, 1915 |
| 1,192,596 | Albrecht | July 25, 1916 |
| 1,271,490 | Servatius | July 2, 1918 |
| 1,787,900 | Goff | Jan. 6, 1931 |
| 1,918,118 | Marzocchi | July 11, 1933 |
| 2,346,953 | Walter | Apr. 18, 1944 |
| 2,466,772 | Kenyon | Apr. 12, 1949 |
| 2,560,060 | Zwosta | July 10, 1951 |

FOREIGN PATENTS

| Number | Country | Date |
|---|---|---|
| 1,687 | Great Britain | Jan. 30, 1889 |
| 123,230 | Great Britain | Feb. 20, 1919 |
| 292,986 | Great Britain | May 23, 1929 |
| 504,486 | Germany | Feb. 12, 1928 |
| 564,872 | Germany | Dec. 6, 1930 |